(12) United States Patent
Matsuura

(10) Patent No.: US 8,224,136 B2
(45) Date of Patent: Jul. 17, 2012

(54) OPTICAL MULTIPLEXER/DEMULTIPLEXER MODULE AND PRISM USING FOR THE SAME

(75) Inventor: Hiroshi Matsuura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 301 days.

(21) Appl. No.: 12/752,505

(22) Filed: Apr. 1, 2010

(65) Prior Publication Data

US 2011/0243502 A1 Oct. 6, 2011

(51) Int. Cl.
*G02B 6/28* (2006.01)
*G02B 6/34* (2006.01)
*G02B 6/42* (2006.01)

(52) U.S. Cl. ............................................. 385/24; 385/36

(58) Field of Classification Search .................... 385/14, 385/16, 36, 147; 359/834; 257/222; 250/208.1, 250/E27.13, 184, 187
See application file for complete search history.

(56) References Cited

U.S. PATENT DOCUMENTS

| | | | | |
|---|---|---|---|---|
| 6,025,958 A | * | 2/2000 | Yamaoka et al. | 359/489.07 |
| 6,095,653 A | * | 8/2000 | Yajima | 353/33 |
| 2005/0180296 A1 | * | 8/2005 | Ooto | 369/112.22 |
| 2006/0198756 A1 | * | 9/2006 | Stein | 420/21 |
| 2007/0003775 A1 | * | 1/2007 | Ushino et al. | 428/500 |
| 2007/0291357 A1 | * | 12/2007 | Oto | 359/485 |
| 2008/0180799 A1 | * | 7/2008 | Ooto | 359/483 |
| 2008/0239487 A1 | * | 10/2008 | Kobayashi et al. | 359/485 |
| 2008/0310285 A1 | * | 12/2008 | Oto | 369/112.16 |

FOREIGN PATENT DOCUMENTS

JP   2003-315611   11/2003

* cited by examiner

*Primary Examiner* — Akm Ullah
(74) *Attorney, Agent, or Firm* — Oblon, Spivak, McClelland, Maier & Neustadt, L.L.P.

(57) ABSTRACT

An optical multiplexer/demultiplexer module comprises: a plurality of prisms, each having an inclined surface that is formed by one of the four orthogonal corners of a transparent rectangular solid glass plate being cut and removed at a 45° angle with respect to the end surface; a frame for housing said plurality of prisms; and a plurality of collimator units that convert light having a different wavelength for each prism to collimated light, and inputs the light to the respective prism. When light a having different wavelength is input to a respective prism, the input light is reflected two times, by the inclined surface and a second end surface, after which the light is output from the respective prism. The light that is output from a previous stage prism of the plurality of prisms advances along the same optical path as the light that is output from a later stage prism, so the light that is output from each respective prism is sequentially multiplexed and wavelength multiplexed light is output from the third end surface of the final stage prism.

7 Claims, 6 Drawing Sheets

OPTICAL MULTIPLEXER/DEMULTIPLEXER MODULE AND PRISM USING FOR THE SAME

BACKGROUND OF THE INVENTION

1. Field of the Invention

The present invention relates to an optical multiplexer/demultiplexer module and prism using the same that are applied to an optical communication system and to the optical measurement field.

2. Description of the Related Art

Recently, with the rapid spread of broadband, study and research in order to increase the speed of optical transmission systems is actively being pursued. Optical multiplexer/demultiplexer modules are used in this kind of optical transmission system. The technology for this kind of optical multiplexer/demultiplexer module is known, such as disclosed in patent document 1. This conventional optical multiplexer/demultiplexer module has construction in which a filter is arranged between two collimating lenses. The filter reflects the λ1 signal light of the collimated light from one collimating lens, and lets the λ2 signal light of the collimated light from the other collimating lens pass through. The λ1 signal light that was reflected by the filter and the λ2 signal light that passed through the filter are optically coupled with an optic fiber by way of the collimating lenses.

[Patent Document 1] Japanese patent Laid-open publication No. 2003-315611

However, in the conventional technology disclosed in patent document 1, in the case where the filter tilts at an angle θ due to change in the ambient temperature, the optical path of the transmitted light does not change, however, since the angle of the reflected light is 2θ, that reflected light is not optically coupled with the optic fiber by way of the collimating lenses.

SUMMARY OF THE INVENTION

It is an object of the present invention to at least partially solve the problems in the conventional technology.

The optical multiplexer/demultiplexer of one form of the present invention comprises: a plurality of prisms, each having an inclined surface that is formed by one of the four orthogonal corners of a transparent rectangular solid glass plate being cut and removed at a 45° angle with respect to the end surface; and a frame for housing the plurality of prisms; wherein each of the plurality of prisms has a first end surface through which a first light having a single wavelength that differs for each prism is input toward the inclined surface, or through which a first light that is reflected by the inclined surface is output; a second end surface that forms a filter having wavelength selectivity such that it reflects the first light and lets light having another wavelength pass through; and a third end surface through which wavelength multiplexed light, which is a multiplexed light having a plurality of different wavelengths, is output or input; and the plurality of prisms are arranged in a row so that when the first light is input from the first end surface of each of the plurality of prisms, that first light is reflected two times, by the inclined surface and the filter, after which the first light is multiplexed with a second light, which passes through the filter, and is output, and when the wavelength multiplexed light is input from the third end surface of one of the plurality of prisms, the first light that is included in that wavelength multiplexed light is reflected two times, by the filter and the inclined surface, and then output from the first end surface, while the light of other wavelengths passes through the filter.

With this kind of construction, even though the prisms may be tilted due to changes in the ambient temperature, that tilt is compensated for, so the light that is output from each prism is only shifted in the horizontal direction with respect to the output light in the case when there is no tilting, it becomes difficult for trouble to occur such as the output light not being able to be optically coupled with an optic fiber by way of a collimating lens, and it is possible to suppress a drop in optical coupling performance due to changes in ambient temperature. Furthermore, in each of the prisms, light is incident on the inclined surface from one of two end surfaces (first end surface) that faces the inclined surface, then the light that is reflected by that inclined surface is reflected by the other of the two end surfaces (second end surface), and that reflected light is output from an end surface (third end surface) that faces the second end surface.

Therefore, the incident angle at the first end surface or third end surface, and the incident angle at the second end surface are each small angles, so the anti-reflective film (AR coating) that is formed on the first end surface or the third end surface, and the polarization dependence of the filter such as a long-wave pass filter (LWPF) that is formed on the second end surface are extremely good, and film design becomes simple.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The preferred embodiments of the present invention will be explained in detail based on the accompanying drawings. In the explanations of the embodiments, the same reference numbers will be used for identical parts and any redundant explanations will be omitted.

Next, embodiments of the optical multiplexer/demultiplexer module of the present invention will be explained based on the drawings.

(Embodiment 1)

Figure 1:
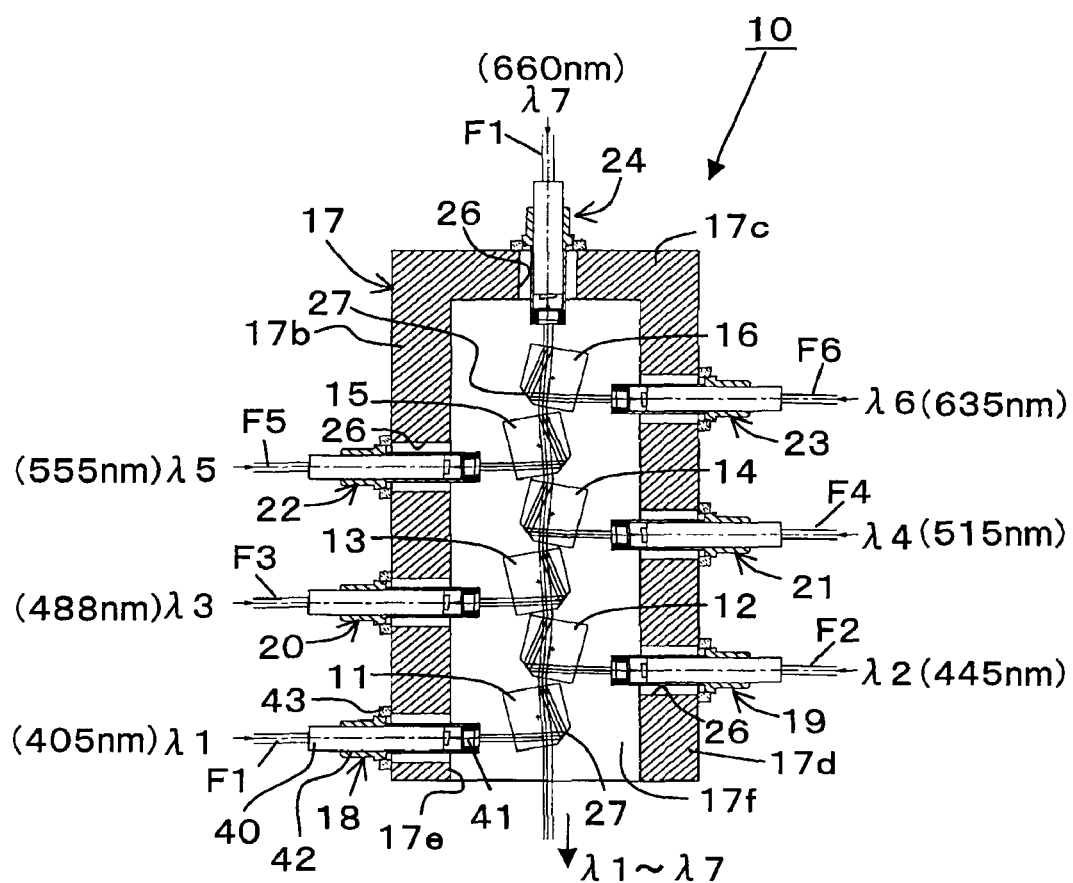
FIG. 1 is a horizontal cross-sectional diagram of an optical multiplexer/demultiplexer module of a first embodiment of the invention.
Figure 2:
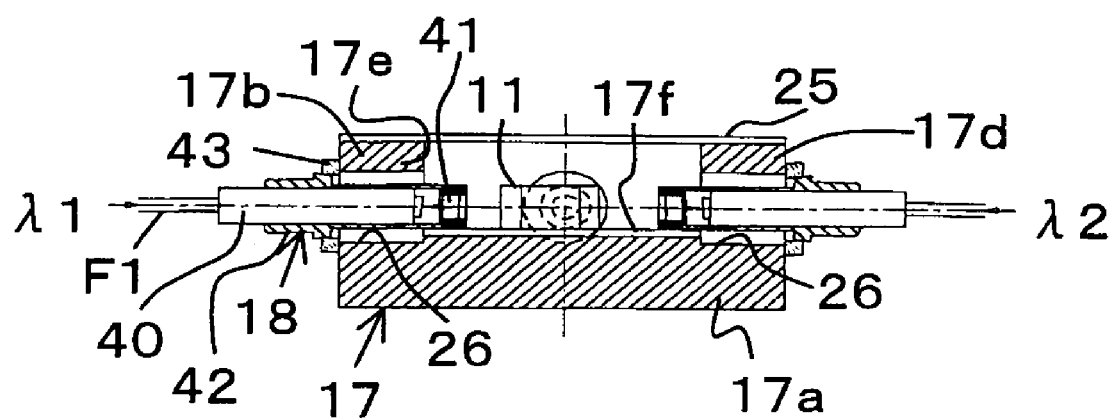
FIG. 2 is a vertical cross-sectional diagram of the optical multiplexer/demultiplexer module of the first embodiment.
Figure 3:
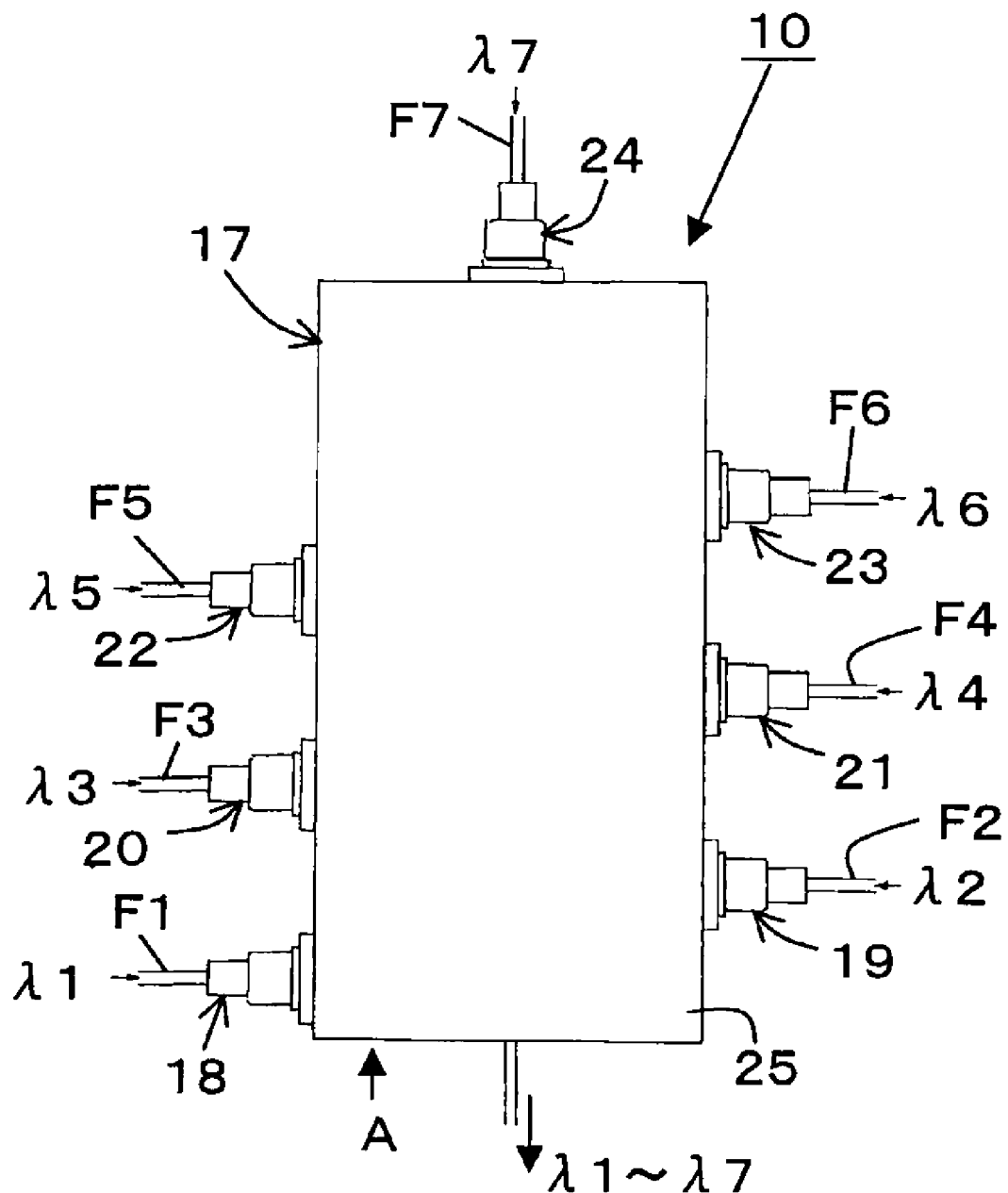
FIG. 3 is a top view of the optical multiplexer/demultiplexer module of the first embodiment.
Figure 4:
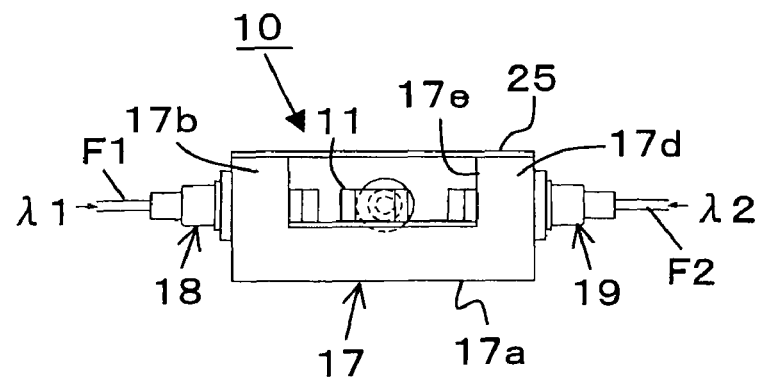
FIG. 4 is a diagram as seen from direction A in FIG. 3.
Figure 5:
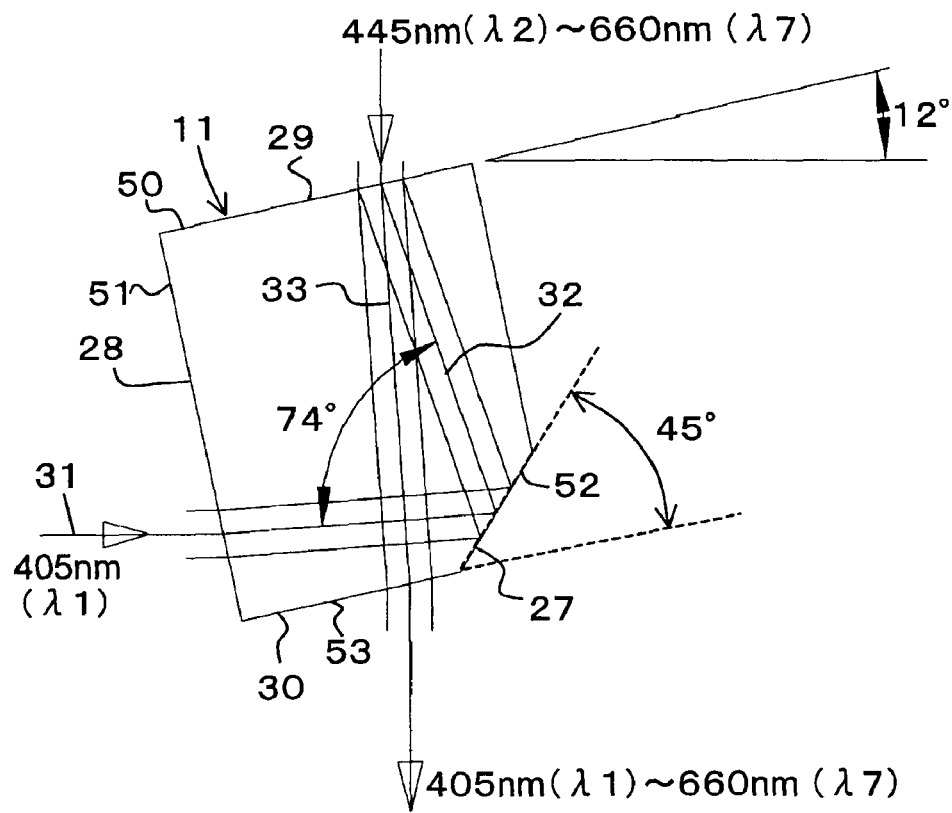
FIG. 5 is a top view of a prism that uses the optical multiplexer/demultiplexer module of the first embodiment.
Figure 6:
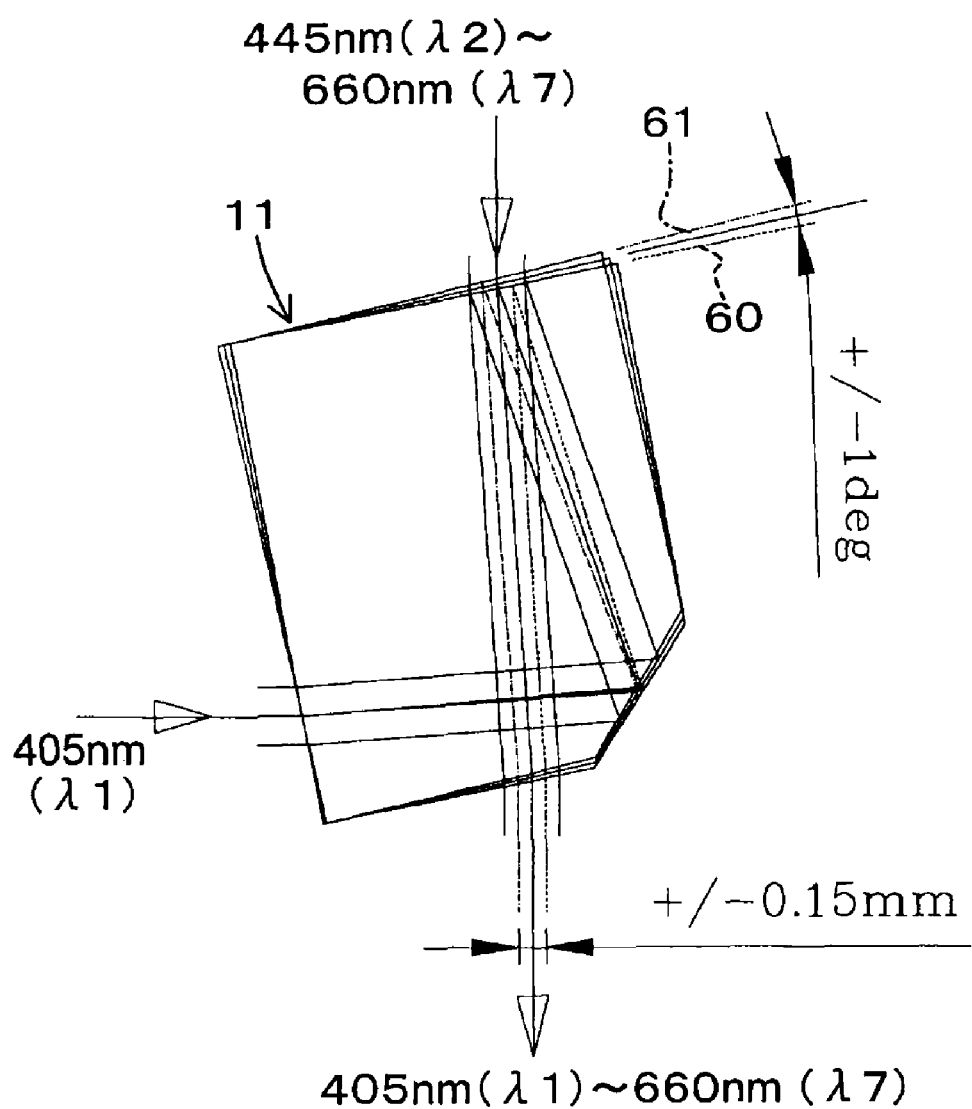
FIG. 6 is a diagram explaining the case where the prism in FIG. 5 is inclined.

FIG. 1 is a horizontal cross-sectional diagram of the optical multiplexer/demultiplexer module of a first embodiment of the invention, and FIG. 2 is a vertical cross-sectional diagram of the optical multiplexer/demultiplexer module. FIG. 3 is a top view of the optical multiplexer/demultiplexer module, and FIG. 4 is a view as seen in the direction of arrow A in FIG. 3. FIG. 5 is a top view of a prism that uses the optical multiplexer/demultiplexer module, and FIG. 6 is a diagram for explaining the case in which the prism in FIG. 5 is inclined.

As illustrated in FIG. 1 and FIG. 5, the optical multiplexer/demultiplexer module 10 comprises a plurality of prisms, each having an inclined surface that is formed by one of the four orthogonal corners of a transparent rectangular solid glass plate being cut and removed at a 45° angle with respect to the end surface. Here, an example is given of an optical multiplexer/demultiplexer module 10 that comprises six prisms 11 to 16, each having the same shape, as the plurality of prisms.

Moreover, as illustrated in FIG. 1 to FIG. 4, the optical multiplexer/demultiplexer module 10 comprises: a frame 17 that houses the plurality of prisms 11 to 16; a plurality of collimator units 18 to 24, each having collimating lenses that respectively collimate light of differing wavelengths and cause that collimated light to enter into the prisms 11 to 16; and a cover 25.

The prisms 11 to 16 are identical prisms, so prism 11 will be explained based on FIG. 5. The prism 11 is a penta prism having an inclined surface 27 that is formed by one of the four orthogonal corners of a transparent rectangular solid glass plate being cut and removed at a 45° angle with respect to the end surface. The other prisms 12 to 16 also have a similar inclined surface 27 that is the same as the inclined surface 27 of prism 11. The thickness of the prism 11 is, for example, 3 mm. The prisms 11 to 16 are not limited to being formed from a rectangular solid glass plate having an inclined surface, and could be formed from a cubic glass plate having an inclined surface.

Each of the plurality of prisms 11 to 16 comprises: a first end surface 28 through which a first light having a single wavelength that differs for each prism is input toward the inclined surface 27, or through which a first light that is reflected by the inclined surface 27 is output; a second end surface 29 that forms a filter having wavelength selectivity such that it reflects the first light and lets light having other wavelengths pass through; and a third end surface 30 through which wavelength multiplexed light, which is multiplexed light comprising a plurality of different wavelengths, is output or input.

In this embodiment, as an example, light having a wavelength λ1 (λ1=405 nm) enters or leaves the first end surface 28 of prism 11, light having a wavelength λ2 (λ1=445 nm) enters or leaves the first end surface 28 of prism 12, light having a wavelength λ3 (λ3=488 nm) enters or leaves the first end surface 28 of prism 13, light having a wavelength λ4 (λ4=515 nm) enters or leaves the first end surface 28 of prism 14, light having a wavelength λ5 (λ5=555 nm) enters or leaves the first end surface 28 of prism 15, and light having a wavelength λ6 (λ6=635 nm) enters or leaves the first end surface 28 of prism 16 (see FIG. 1). Furthermore, light having a wavelength λ7 (λ7=660 nm) enters through the second end surface 19 of prism 16 as the first light.

There is also a longwave pass filter (LPF) 50 formed in the second end surface 29 of each of the prisms 11 to 16, as a filter having wavelength selectivity of reflecting the first light and allowing light of other wavelengths to pass. This longwave pass filter is a dielectric multilayer film filter. The longwave pass filter that is formed on the second end surface 29 of prism 11 has wavelength selectivity that reflects the light having wavelength λ1 (405 nm), and allows light having longer wavelengths than λ1 (λ2 to λ7) to pass. The longwave pass filter that is formed on the second end surface 29 of prism 12 has wavelength selectivity that reflects the light having wavelength λ2 (445 nm), and allows light having longer wavelengths than λ2 (λ3 to λ7) to pass. The longwave pass filter that is formed on the second end surface 29 of prism 13 has wavelength selectivity that reflects the light having wavelength λ3 (448 nm), and allows light having longer wavelengths than λ3 (λ4 to λ7) to pass. The longwave pass filter that is formed on the second end surface 29 of prism 14 has wavelength selectivity that reflects the light having wavelength λ4 (515 nm), and allows light having longer wavelengths than λ4 (λ5 to λ7) to pass. The longwave pass filter that is formed on the second end surface 29 of prism 15 has wavelength selectivity that reflects the light having wavelength λ5 (555 nm), and allows light having longer wavelengths than λ5 (λ6, λ7) to pass. The longwave pass filter that is formed on the second end surface 29 of prism 16 has wavelength selectivity that reflects the light having wavelength λ6 (635 nm), and allows light having longer wavelengths than λ6 (λ7=660 nm) to pass.

In each of the prisms 11 to 16, as shown in FIG. 5, in the case of multiplexing, collimated light (incident light 31) enters from one of the two end surfaces (first end surface 28) that faces the inclined surface 27, which is formed by cutting at an angle that is 45° with respect to the end surface, and light that is reflected by the inclined surface 27 (reflected light 32) is reflected by the other of the two surfaces (second end surface 29) and that reflected light 33 is output from the third end surface 30 that faces the second end surface 29.

Moreover, in each of the prisms 11 to 16, as shown in FIG. 5, an antireflective film (AR coating) 51 is formed on the first end surface 28 that allows the incident light 31 to pass, a high reflecting film (HR film) 52 is formed on the inclined surface 27, a longwave pass filter 50 described above is formed on the second end surface 29, and an antireflective film 53 is formed on the third end surface 30 that faces the second end surface 29.

The prisms 11 to 16 are arranged in a row such that they satisfy the following conditions.

(1) As illustrated in FIG. 1, when first light enters in from the first end surface 28, the first light is reflected two times, by the inclined surface 27 and by the longwave pass filter 50 that is formed on the second end surface 29, after which it is multiplexed with the second light that passes through the longwave pass filter 50 and is output from the third end surface 30. Here, as was explained above, the first light is light having wavelength λ1 in prism 11, is light having wavelength λ2 in prism 12, is light having wavelength λ3 in prism 13, is light having wavelength λ4 in prism 14, is light having wavelength λ5 in prism 15, and is light having wavelength λ6 in prism 16.

(2) When wavelength multiplexed light comprising a plurality of light of differing wavelengths (λ1 to λ7) is input from the third end surface 30 of one (prism 11) of the plurality of prisms 11 to 16, the first light that is included in the wavelength multiplexed light is reflected two times, by the longwave pass filter 50 and the inclined surface 27, after which that first light is output from the first end surface 28 and the light of other wavelengths is allowed pass through the longwave pass filter 50.

Moreover, the prisms 11 to 16 are arranged in a row with the left and right alternately reversed such that the position of the inclined surface 27 of each prism is alternately changed between the left and right of adjacent prisms. In this embodiment, the prisms 11 to 16 are arranged such that the inclined surface 27 of prism 11 is positioned at the bottom right of FIG. 1, the inclined surface 27 of prism 12 is positioned at the bottom left, the inclined surface 27 of prism 13 is positioned at the bottom right, the inclined surface 27 of prism 14 is positioned at the bottom left, the inclined surface 27 of prism 15 is positioned at the bottom right, and the inclined surface 27 of prism 16 is positioned at the bottom left.

The frame 17, as illustrated in FIG. 1 to FIG. 4, comprises a base section 17a in which the prisms 11 to 16 are arranged as described above and fastened using adhesive or the like, and three wall sections 17b, 17c, 17d that are formed by the inner three sides of the four sides of the base section 17a. There is no wall section formed in edge section of the one remaining side of the base section 17a, and the side of one end of the frame 17 becomes an opening section 17e. As illustrated in FIG. 1 and FIG. 2, the prisms 11 to 16 are arranged on the top surface 17f of the base section 17 in a row as described above and fastened with adhesive or the like.

An installation hole 26 for mounting three collimator units 18, 20, 22 are formed in the wall section 17b of the frame 17, an installation hole 26 for mounting a collimator unit 24 is formed in the wall section 17c, and an installation hole 26 for mounting three collimator units 19, 21, 23 are formed in the wall section 17d.

The collimator units 18 to 24 convert the light of wavelengths $\lambda 1$ to $\lambda 7$ that are respectively transmitted from single-mode optic fibers F1 to F7 to collimated light and then let the light enter into the respective prism 11 to 16.

As illustrated in FIG. 1 and FIG. 2, the collimator unit 18 comprises a ferrule 40 that holds the single-mode optic fiber F1, a collimating lens 41, a sleeve 42 that holds the ferrule 40 and collimating lens 41, and a spherical ring 43 that supports the sleeve 42 so that it can rotate freely. In the case of collimator unit 18, by inserting part thereof into the installation hole 26 of the wall section 17b and moving the sleeve 42 back-and-forth with respect to the spherical ring 43, the light having wavelength $\lambda 1$ (405 nm) that is transmitted from the single-mode optic fiber F1 is converted to collimated light and aligned such that it enters prism 11 at a specified incident angle. After this alignment, the spherical ring 43 and sleeve are fastened by welding, and the spherical ring 43 is further fastened to the outer surface of the wall section 17b of the frame 17 by welding. The collimator units 19, 20, 21, 22 and 23 all have the same construction as collimator unit 18. In FIG. 1 and FIG. 2, in order to avoid complexity of the figures, the reference numbers of the members that form the collimator units 19 to 24 have been omitted.

In the optical multiplexer/demultiplexer module 10, light having a wavelength $\lambda 1$ (405 nm) that has been converted to collimated light by the collimator unit 18 enters the prism 11 from the first end surface 28. Light having a wavelength $\lambda 2$ (445 nm) that has been converted to collimated light by the collimator unit 19 enters the prism 12 from the first end surface 28. Light having a wavelength $\lambda 3$ (488 nm) that has been converted to collimated light by the collimator unit 20 enters the prism 13 from the first end surface 28. Light having a wavelength $\lambda 4$ (515 nm) that has been converted to collimated light by the collimator unit 21 enters the prism 14 from the first end surface 28. Light having a wavelength $\lambda 5$ (555 nm) that has been converted to collimated light by the collimator unit 22 enters the prism 15 from the first end surface 28. Light having a wavelength $\lambda 6$ (635 nm) that has been converted to collimated light by the collimator unit 23 enters the prism 16 from the first end surface 28. In addition, light having a wavelength $\lambda 7$ (660 nm) that has been converted to collimated light by the collimator unit 24 enters the prism 16 from the second end surface 29.

Moreover, the plurality of prisms 11 to 16 are arranged in a row so that light that is output from an adjacent prism and irradiated from the second end surface 29, enters from the first end surface 28 and is reflected by the inclined surface 27, and that reflected light (reflected light 32 in FIG. 1) takes the same path as the light (reflected light 33 in FIG. 1) that is reflected again by the second end surface 29 and is output. The operation of an optical multiplexer/demultiplexer module 10 having this kind of construction is explained.

(Multiplexing)

First, multiplexing will be explained.

When light having differing wavelengths respectively enters the plurality of prisms 11 to 16, each input light is reflected two times in the prism, by the inclined surface 27 and the second end surface 29, after which the light is output from the prism. The light that is output from an earlier stage prism (for example the first stage prism 16) of the plurality of prisms advances along the same optical path as light that is output from a later stage prism (second stage prism 15), so the light that is output from each prism is sequentially multiplexed, and wavelength multiplexed light, in which light having wavelengths $\lambda 1$ to $\lambda 7$ is multiplexed, is output from the third end surface 30 of the final stage prism 11. In other words, collimated light having wavelength $\lambda 6$ that is input from the first end surface 28 of prism 16 is reflected by the inclined surface 27 and the second end surface 29. This reflected light (reflected light 33 in FIG. 1) takes the same optical path as the collimated light having wavelength $\lambda 7$ that is input from the second end surface 29 of prism 16, and is output from the third end surface 30.

This output light, that is, multiplexed light comprising collimated light having wavelength $\lambda 6$ and collimated light having wavelength $\lambda 7$, enters the second end surface 29 of the next stage prism 15. This input light takes the same optical path as the collimated light having wavelength $\lambda 5$ that is input from the first end surface 28 of prism 15 and reflected by the inclined surface 27 and second end surface 29, and is output from the third end surface 30.

This output light, or in other words the multiplexed light comprising collimated light having wavelengths $\lambda 5$, $\lambda 6$ and $\lambda 7$, is input to the second end surface 29 of the next stage prism 14. This input light takes the same optical path as the collimated light having wavelength $\lambda 4$, which is input from the first end surface 28 of the prism 14 and reflected by the inclined surface 27 and the second end surface 29, and is output from the third end surface 30.

This output light, or in other words the multiplexed light comprising collimated light having wavelengths $\lambda 4$, $\lambda 5$, $\lambda 6$ and $\lambda 7$, is input to the second end surface 29 of the next stage prism 13. This input light takes the same optical path as the collimated light having wavelength $\lambda 3$, which is input from the first end surface 28 of the prism 13 and reflected by the inclined surface 27 and the second end surface 29, and is output from the third end surface 30.

This output light, or in other words the multiplexed light comprising collimated light having wavelengths $\lambda 3$, $\lambda 4$, $\lambda 5$, $\lambda 6$ and $\lambda 7$, is input to the second end surface 29 of the next stage prism 12. This input light takes the same optical path as the collimated light having wavelength $\lambda 2$, which is input from the first end surface 28 of the prism 12 and reflected by the inclined surface 27 and the second end surface 29, and is output from the third end surface 30.

This output light, or in other words the multiplexed light comprising collimated light having wavelengths $\lambda 2$, $\lambda 3$, $\lambda 4$, $\lambda 5$, $\lambda 6$ and $\lambda 7$, is input to the second end surface 29 of the next stage prism 11. This input light takes the same optical path as the collimated light having wavelength $\lambda 1$, which is input from the first end surface 28 of the prism 11 and reflected by the inclined surface 27 and the second end surface 29, and is output from the third end surface 30. As illustrated in FIG. 1, wavelength multiplexed light comprising collimated light having wavelengths λ1 to λ7 is output. Multiplexing is performed in this way.

(Demultiplexing)

Next, demultiplexing will be explained.

When using the optical multiplexer/demultiplexer module 10 illustrated in FIG. 1 for demultiplexing, wavelength multiplexed light comprising multiplexed light of wavelengths λ1 to λ7 is converted to collimated light by a collimator unit (not shown in the figure) and input. In this case, the light takes an optical path that is opposite that of the case of multiplexing described above, so the collimated light having wavelengths λ1 to λ5 are separately output from the respective prisms 11 to 15, and collimated light having wavelengths λ6 and λ7 are respectively output from the first end surface 28 second end surface 29.

The first embodiment that is constructed as described above has the following functional advantages.

When single wavelength first light of different wavelengths (λ1 to λ7) is respectively input to the prisms 11 to 16, the wavelength multiplexed light comprising a plurality of multiplexed light of different wavelengths is output from the third end surface 30 of one of the prisms 11 to 16 (final stage prism 11) that are arranged in a row, and multiplexed. By doing so, the wavelength multiplexed light comprising multiplexed light of wavelengths λ1 to λ7 can be optically coupled with a single-mode optic fiber (not shown in the figure) via a collimating lens (not shown in the figure).

When wavelength multiplexed light comprising multiplexed light of wavelengths λ1 to λ7 is input from the third end surface 30 of prism 11 (first stage) of the prisms 11 to 16, by respectively outputting first light having different wavelengths (λ1 to λ7) for each prism from the first end surface 28 of each prism 11 to 16, the light is demultiplexed. In this way, light of each wavelength λ1 to λ7 is optically coupled with single-mode optical fibers via the collimator lenses of the collimator units 18 to 24.

In each prism 11 to 16, the input light (first light that is input from the first end surface 28, or wavelength multiplexed light that is input from the third end surface 30) is reflected two times and output. In other words, in the case of multiplexing, first light that is input from the first end surface 28 is reflected two times, by the inclined surface 27 and the longwave pass filter 50 on the second end surface 29, after which it is output. In the case of demultiplexing, wavelength multiplexed light that is input from the third end surface 30 is separated by the longwave pass filter 50 into first light and light having wavelengths longer than the first light, and the first light that is reflected by the longwave pass filter 50 is then reflected by the inclined surface and output from the first end surface 28.

In this way, in each of the prisms 11 to 16, the input light is reflected two times and then output. By doing so, even though the prisms 11 to 16 may be tilted due to changes in the ambient temperature, that tilt is compensated for, so the light that is output from each prism is only shifted in the horizontal direction with respect to the output light in the case when there is no tilting, and it is possible to suppress the occurrence of trouble such as the output light not being able to be optically coupled with an optic fiber by way of a collimating lens. Therefore, it is possible to suppress a drop in the optical coupling performance due to tilting of the prism (optical parts) caused by a change in ambient temperature. As illustrated in FIG. 6, when the prism 11 tilts by +1° or −1° as illustrated by the dashed line 60 or dashed-dotted line 61, the light that is output from the third end surface 30 is shifted only in the horizontal direction by +0.15 mm or −0.15 mm with respect to light that is output when there is not tilting.

In each prism, light is input to the inclined surface 27 from one of the two end surfaces (first end surface 28) that face the inclined surface 27, then the light 32 that is reflected by the inclined surface 27 is also reflected by the other of the two end surfaces (second end surface 29), and that reflected light 33 is output from the end surface (third end surface 30) that faces the second end surface 29. Therefore, the incident angle of the incident light on the inclined surface 27 and the reflection angle are about 37°, the incident angle at the first end surface 28 or third end surface 30, and the incident angle at the second end surface 29 are each small angles of about 12°, so the anti-reflective film that is formed on the first end surface 28 or the third end surface 30, and the polarization dependence of the filter such as a longwave pass filter that is formed on the second end surface 29 are extremely good, and film design becomes simple.

A plurality of collimator units 18 to 24, having collimating lenses 41 that convert single-wavelength first light of different wavelengths for each prism to collimated light, are respectively mounted in the frame 17 for each of the plurality of prisms 11 to 16, so it is possible to convert the light having different wavelengths for each prism to collimated light, then input the light.

The plurality of prisms 11 to 16 are arranged in a row such that they are alternately left-right reversed, so it is possible to alternately change the direction of input light to the prisms. By doing so, it is possible to arrange the collimator units 18 to 24, having collimating lenses 41 that individually input light to the prisms 11 to 16, in the frame 17 such that they are alternately left-right reversed, and thus it is possible to improve freedom of the design.

In each of the prisms 11 to 16, an anti-reflective film 51 is formed on the first end surface 28, a highly reflective film 52 is formed on the inclined surface 27, and an anti-reflective film 53 is formed on the third end surface 30, so it is possible to suppress loss at the first end surface 28, inclined surface 27 and third end surface 30 in each of the prisms 11 to 16.

Of the plurality of prisms 11 to 16 that are arranged in a row, light having a wavelength λ6 is input to the first end surface and light having wavelength λ7 is input to the second end surface of prism 16, to which or from which wavelength multiplexed light that comprises a plurality of multiplexed light having different wavelengths (λ1 to λ7) is input or output and which is on the end opposite the prism 11. In other words, light having different wavelengths is respectively input to the first end surface and the second end surface of one prism 16 to which or from which wavelength multiplexed light that comprises a plurality of multiplexed light having different wavelengths is input or output and which is on the end opposite the prism 11. In this way, the optical multiplexer/demultiplexer module 10 illustrated in FIG. 1 is constructed such that by using the second end surface 29 of prism 16, which is located at the end of a plurality of prisms that are arranged in a row and to which no light that is output from another prism is input, light is input (in the case of multiplexing) or output (in the case of demultiplexing) from that end surface 29 as well. By doing so, it is possible to multiplex or demultiplex a number of lights that is one more than the number of prisms.

The optical multiplexer/demultiplexer module 10 has the advantage in that it uses light covering a wavelength band from 350 nm to 900 nm for each of the plurality of prisms 11 to 16. The present invention can be changed and embodied as described below.

Figure 7:
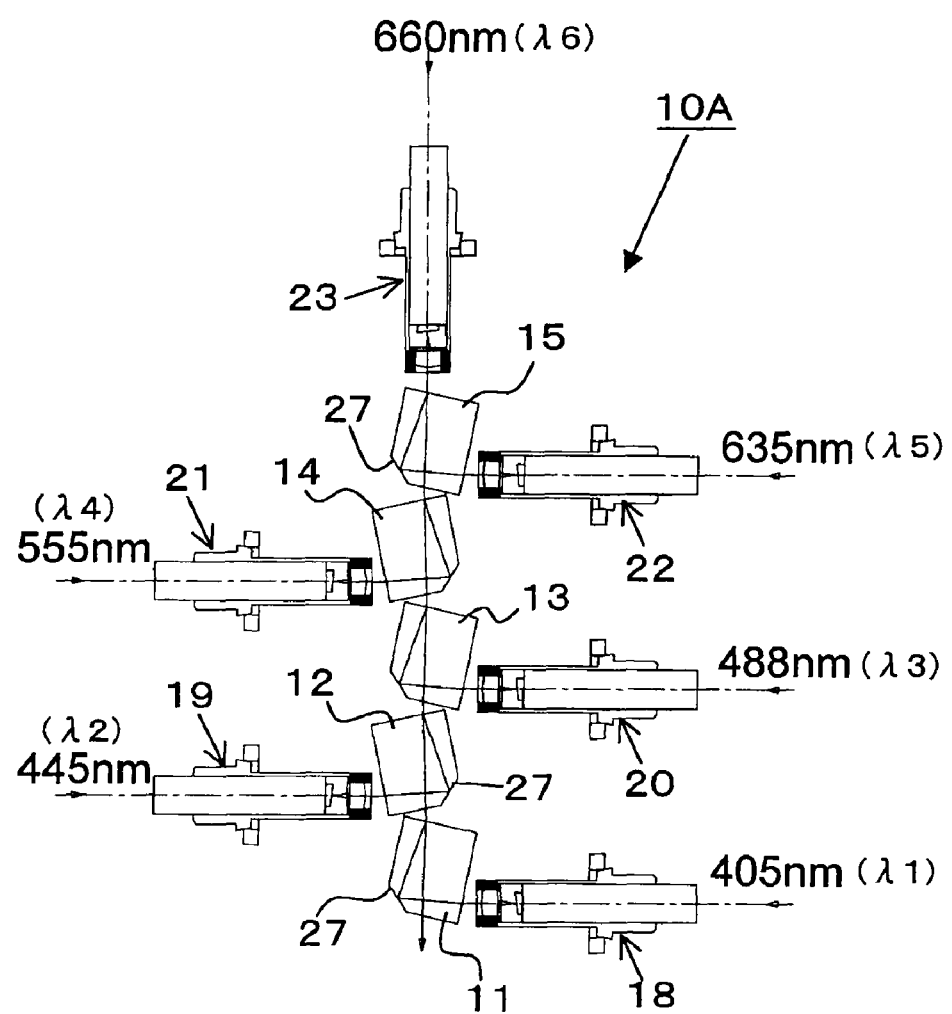
FIG. 7 is a top view of the construction of a variation of the optical multiplexer/demultiplexer module of the first embodiment.

In the first embodiment described above, an example of an optical multiplexer/demultiplexer comprising six prisms 11 to 16, and seven collimator units 18 to 24 was explained, however, the number of prisms is not limited to six and the number of collimator units is not limited to seven. For example, as illustrated in FIG. 7, the invention can also be applied to an optical multiplexer/demultiplexer module 10A that comprises five prisms 11 to 15 and six collimator units 18 to 23. In the optical multiplexer/demultiplexer module 10A in FIG. 10A, the frame 17 that is shown in FIG. 1 and FIG. 2 is omitted.

In the first embodiment described above, identical prisms were used as the plurality of prisms 11 to 16, however the present invention can be widely applied to optical multiplexer/demultiplexer modules that comprise a plurality of prisms that are arranged in a row so that the conditions described above are satisfied, and the prisms do not necessarily need to be identical.

It is preferred that the plurality of prisms 11 to 16 be arranged in a row such that they are alternately left-right inversed as in the first embodiment described above, however, the present invention can also be applied to an optical multiplexer/demultiplexer module that is constructed such that the left-right direction of all of the plurality of prisms is the same.

In the first embodiment described above, of the plurality of prisms 11 to 16, light having wavelength $\lambda 6$ is input to the first end surface and light having wavelength $\lambda 7$ is input to the second end surface of the prism 16 that is located at the end opposite from prism 11, however, the invention can also be applied to an optical multiplexer/demultiplexer module that is constructed such that light having wavelength $\lambda 7$ is not input to that second end surface.

Although the invention has been described with respect to specific embodiments for a complete and clear disclosure, the appended claims are not to be thus limited, but are to be construed as embodying all modifications and alternative construction that may occur to one skilled in the art that falls within the basic teaching herein set forth.

What is claimed is:

1. An optical multiplexer/demultiplexer module comprising:
    a plurality of prisms, each having an inclined surface that is formed by one of the four orthogonal corners of a transparent rectangular solid glass plate being cut and removed at a 45° angle with respect to the end surface; and
    a frame for housing said plurality of prisms; wherein
    each of said plurality of prisms has a first end surface through which a first light having a single wavelength that differs for each prism is input toward the inclined surface, or through which a first light that is reflected by the inclined surface is output; a second end surface that forms a filter having wavelength selectivity such that it reflects the first light and lets light having other wavelengths pass through; and a third end surface through which wavelength multiplexed light, which is a multiplexed light having a plurality of different wavelengths, is output or input; and
    said plurality of prisms are arranged in a row so that when said first light is input from said first end surface of each of said plurality of prisms, that first light is reflected two times, by said inclined surface and said filter, after which the first light is multiplexed with a second light, which passes through the filter, and is output, and when said wavelength multiplexed light is input from said third end surface of one of said plurality of prisms, said first light that is included in that wavelength multiplexed light is reflected two times, by said filter and said inclined surface, and then output from said first end surface, while the light of other wavelengths passes through said filter.

2. The optical multiplexer/demultiplexer module according to claim 1, wherein
    a plurality of collimator units, having collimator lenses that convert first light having different wavelengths for each respective prism to collimated light and input the respective light to each of said plurality of prisms, are mounted in said frame.

3. The optical multiplexer/demultiplexer module according to claim 2, wherein
    said plurality of prisms are arranged in a row so that they are alternately left-right reversed.

4. The optical multiplexer/demultiplexer module according to claim 1, wherein
    an anti-reflective film is formed on said first end surface, a highly reflective film is formed on said inclined surface and an anti-reflective film is formed on said third end surface of each of said plurality of prisms.

5. The optical multiplexer/demultiplexer module according to claim 1, wherein
    light within a wavelength band of 350 nm to 900 nm is input to each of said plurality of prisms.

6. The optical multiplexer/demultiplexer module according to claim 1, wherein
    of said plurality of prisms, light having different wavelengths is respectively input to the first end surface and the second end surface of the prism on the opposite end, to and from which wavelength multiplexed light that comprises a multiplexed light having a plurality of different wavelengths is input or output.

7. A prism that is used in the optical multiplexer/demultiplexer according to claim 1 having an inclined surface that is formed by one of the four orthogonal corners of a transparent rectangular solid glass plate being cut and removed at a 45° angle with respect to the end surface.

* * * * *